United States Patent Office 2,906,772
Patented Sept. 29, 1959

2,906,772

RESOLUTION OF dl-2,2-DIPHENYL-3-METHYL-4-DIMETHYLAMINOBUTYRONITRILE

John Weijlard, Maplewood, N.J., assignor to Merck & Co., Inc., Rahway, N.J., a corporation of New Jersey No Drawing. Application November 22, 1952
Serial No. 322,139

4 Claims. (Cl. 260—465)

This invention is concerned with the resolution of dl-2,2-diphenyl-3-methyl-4-dimethylamino-butyronitrile into its individual stereoisomers. More particularly, it relates to a novel process for preparing d-2,2-diphenyl-3-methyl-4-dimethylamino-butyronitrile in pure form and in excellent yield from the corresponding racemate. The d-2,2-diphenyl-3-methyl-4-dimethylamino-butyronitrile thus obtained is useful as an intermediate in the preparation of the laevorotatory isomer of isoamidone.

The racemic form of isoamidone, which can be prepared as described in U.S. Patent No. 2,538,130, issued January 16, 1951, has the chemical name 1-dimethylamino-2-methyl-3,3-diphenylhexanone-4 and the structural formula:

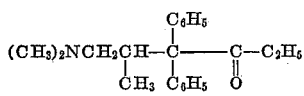

This compound is useful as an analgesic and as a morphine substitute. The toxicity of dl-isoamidone, however, presents a problem in the use and administration of the drug. Surprisingly enough, although both l-isoamidone and d-isoamidone possess approximately the same toxicity, the analgesic activity of l-isoamidone is over thirty times greater than that possessed by d-isoamidone. Thus, when l-isoamidone is substituted for the dl-mixture, the dosage required to produce a given analgesic effect is reduced to one-half, with a proportional decrease in the toxic effect of the drug.

Although it is possible to resolve dl-isoamidone to produce the desired l-isoamidone in pure form, this procedure results in the formation of an equal quantity of the unwanted d-isomer. Therefore, the cost of manufacturing l-isoamidone is approximately twice what it would be if it were possible directly to synthesize the l-isoamidone, in a form substantially free of the d-isomer.

I have now discovered that, when the dextrotatory isomer of 2,2-diphenyl-3-methyl-4-dimethylaminobutyronitrile is reacted with ethyl magnesium bromide and the Grignard intermediate hydrolyzed, there is obtained directly the laevorotatory isomer of 1-dimethylamino-2-methyl-3,3-diphenylhexanone-4, otherwise known as l-isoamidone.

I have further discovered that the dextrotatory isomer of 2,2-diphenyl-3-methyl-4-dimethylamino-butyronitrile can be obtained in a form free of the l-isomer, by reacting together, in solution in a lower alkanol containing a small amount of water, dl-2,2-diphenyl-3-methyl-4-dimethylaminobutyronitrile and (L+) p-nitrobenzoyl-glutamic acid, thereby forming an alcoholic solution containing the (L+)p-nitrobenzoyl-glutamic acid salts of both d- and l-2,2-diphenyl-3-methyl-4-dimethylaminobutyronitrile and cooling this solution whereupon the sparingly soluble (L+)p-nitrobenzoyl-glutamic acid salt of d-2,2-diphenyl-3-methyl-4-dimethylamino-butyronitrile precipitates, whereas the corresponding salt of l-2,2-diphenyl-3-methyl-4-dimethylamino-butyronitrile remains in solution. As the lower alkanol, I ordinarily employ ethanol, isopropanol, butanol or amyl alcohol; the alcohol must contain a small amount, preferably 5%, of water. I prefer to conduct the reaction by dissolving the dl-2,2-diphenyl-3-methyl-4-dimethylamino-butyronitrile and the (L+)p-nitrobenzoylglutamic acid in hot 95% aqueous ethanol; upon cooling this ethanolic solution the (L+)p-nitrobenzoyl-glutamic acid salt of d-2,2-diphenyl-3-methyl-4-dimethylamino-butyronitrile precipitates and is recovered by filtration. The (L+)p-nitrobenzoyl-glutamic acid salt of d-2,2-diphenyl-3-methyl-4-dimethylamino-butyronitrile is then reacted with an aqueous solution of a strong inorganic base, preferably an aqueous solution of an alkali metal hydroxide such as sodium hydroxide, potassium hydroxide, ammonium hydroxide, and the like, thereby liberating the d-2,2-diphenyl-3-methyl-4-dimethylamino-butyronitrile. This reaction is ordinarily carried out, and the d-2,2-diphenyl-3-methyl-4-dimethylamino-butyronitrile recovered from the reaction mixture, by suspending the (L+)p-nitrobenzoyl glutamic acid salt of d-2,2-diphenyl-3-methyl-4-dimethylamino-butyronitrile in the aqueous alkali metal hydroxide solution and extracting the resulting aqueous alkaline mixture with a water-immiscible organic solvent such as chloroform, carbon tetrachloride, benzene, toluene, petroleum ether, ethylene dichloride, and the like. The organic solvent extract is washed with water, dried and the solvent evaporated to give substantially pure d-2,2-diphenyl-3-methyl-4-dimethylamino-butyronitrile which is obtained in accordance with the foregoing procedure, in the form of a white crystalline solid.

If desired, the resulting mother liquor and washes, which contain the (L+)p-nitrobenzoyl-glutamic acid salt of l-2,2-diphenyl-3-methyl-4-dimethylamino-butyronitrile can be evaporated and treated with an aqueous solution of a strong inorganic base such as aqueous sodium hydroxide, aqueous potassium hydroxide aqueous ammonium hydroxide, and the like, thereby liberating l-2,2-diphenyl-3-methyl-4-dimethylamino-butyronitrile, which can be conveniently recovered from the aqueous alkaline mixture by extraction with a water-immiscible organic solvent followed by evaporation of the non-aqueous solvent extract to produce l-2,2-diphenyl-3-methyl-4-dimethylamino-butyronitrile.

The following example illustrates a method of carrying out the present invention, but it is to be understood that this example is given for purposes of illustration and not of limitation.

Example 1

One hundred and thirty grams (0.467 mole) of dl-2,2-diphenyl-3-methyl-4-dimethylamino-butyronitrile (which can be prepared in accordance with the procedure set forth in U.S. Patent No. 2,574,505, issued November 13, 1951) and 138 g. (0.467 mole) of (L+)p-nitrobenzoyl-glutamic acid are dissolved in 1000 cc. of hot 95% aqueous ethanol. The resulting solution is cooled to approximately 25° C. and stirred at that temperature until crystallization is well under way; this initial crystallization can be expedited by seeding the solution with crystals of the (L+)p-nitrobenzoyl-glutamic acid salt of d-2,2-diphenyl-3-methyl-4-dimethylamino-butyronitrile. The crystalline slurry is cooled to about 2° C. and held at that temperature for an additional period of about twenty-four hours. The crystalline slurry is then filtered, and the crystalline solid material is washed with two 50 cc.-portions of ice-cold ethanol, then with two 150 cc.-portions of ether, and air dried at a temperature of about 45° C. to give 95.0 g. of the (L+)p-nitrobenzoyl-glutamic acid salt of d-2,2-diphenyl-3-methyl-4-dimethylamino-butyronitrile; $[\alpha]_D^{25} = +30°$; yield approximately 71% of theory.

Ninety-five grams of the (L+)p-nitrobenzoyl-glutamic acid salt $d$-2,2-diphenyl-3-methyl - 4 - dimethylamino-butyronitrile is suspended in 180 cc. of a 10% solution of aqueous sodium hydroxide, the mixture is extracted with three 60 cc.-portions of benzene and the benzene extracts are combined. The resulting benzene solution is washed with two 25 cc.-portions of water, dried over anhydrous calcium sulfate, and evaporated to dryness in vacuo to give 44 g. of $d$-2,2-diphenyl-3-methyl-4-dimethylamino-butyronitrile; $[\alpha]_D^{25} = +62°$; yield approximately 95% of that theoretically obtainable based on the (L+)p-nitrobenzoyl-glutamic acid salt of $d$-2,2 - diphenyl - 3-methyl-4-dimethylamino-butyronitrile starting material.

Various changes and modifications may be made in carrying out the present invention without departing from the spirit and scope thereof. Insofar as these changes and modifications are within the purview of the annexed claims, they are to be considered as part of my invention.

I claim:

1. In the process of preparing $d$-2,2-diphenyl-3-methyl-4-dimethylamino-butyronitrile from a mixture containing the laevorotatory and dextrorotatory isomers of 2,2-diphenyl - 3 - methyl-4-dimethylamino-butyronitrile, the steps which comprise treating said mixture containing said laevorotatory and dextrorotatory isomers of 2,2-diphenyl - 3 - methyl - 4 - dimethylamino-butyronitrile with (L+)p-nitrobenzoyl-glutamic acid in solution in a lower alkanol containing a small amount of water, whereupon the (L+)p-nitrobenzoyl-glutamic acid salt of $d$-2,2-diphenyl - 3 - methyl - 4 - dimethylamino-butyronitrile precipitates from said solution, and recovering said precipitated salt of $d$-2,2-diphenyl-3-methyl-4-dimethylamino-butyronitrile.

2. In the process of resolving $dl$-2,2-diphenyl-3-methyl-4-dimethylamino-butyronitrile to produce $l$-2,2-diphenyl-3-methyl-4-dimethylamino-butyronitrile, the steps which comprise treating said $dl$-2,2-diphenyl - 3 - methyl-4-dimethylamino-butyronitrile with (L+)p-nitrobenzoyl-glutamic acid in ethanolic solution containing about 5% of water whereupon the sparingly soluble (L+)p-nitrobenzoyl-glutamic acid salt of $d$-2,2-diphenyl-3-methyl-4-dimethylamino-butyronitrile precipitates from said solution, and recovering said precipitated salt of $d$-2,2-diphenyl-3-methyl-4-dimethylamino-butyronitrile.

3. In the process of preparing $d$-2,2-diphenyl-3-methyl-4-dimethylamino-butyronitrile from a mixture containing the laevorotatory and dextrorotatory isomers of 2,2-diphenyl-3-methyl - 4 - dimethylamino-butyronitrile, the steps which comprise treating said mixture containing said laevorotatory and dextrorotatory isomers of 2,2-diphenyl-3-methyl-4 - dimethylamino-butyronitrile with (L+)p-nitrobenzoyl-glutamic acid in solution in a lower alkanol containing about 5% of water, whereupon the (L+)p-nitrobenzoyl-glutamic acid salt of $d$-2,2 - diphenyl - 3-methyl - 4-dimethylamino-butyronitrile precipitates from said solution, and recovering said precipitated salt of $d$-2,2-diphenyl-3-methyl-4-dimethylamino-butyronitrile.

4. (L+)p-nitrobenzoyl-glutamic acid salt of $d$-2,2-diphenyl-3-methyl-4-dimethylamino-butyronitrile.

References Cited in the file of this patent

UNITED STATES PATENTS

| | | |
|---|---|---|
| 2,540,636 | Stoughton | Feb. 6, 1951 |
| 2,644,010 | Howe et al. | June 30, 1953 |

OTHER REFERENCES

Winter: J. Am. Chem. Soc., vol. 62, pp. 3266–7 (1940).

Karrer: Organic Chemistry, 2nd English edit. (1946), p. 97.

Howe et al.: J. Chem. Soc., vol. 71, pp. 2935–6 (1949).